Dec. 23, 1924.
H. DROTSCHMANN
ROLLER BEARING
Filed Feb. 11, 1924
1,520,053
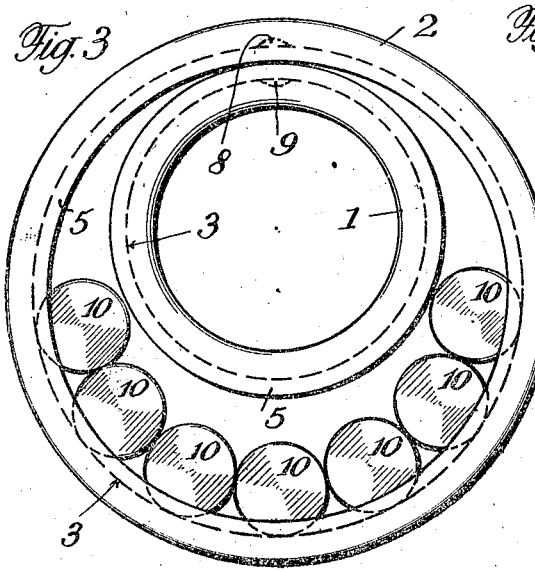
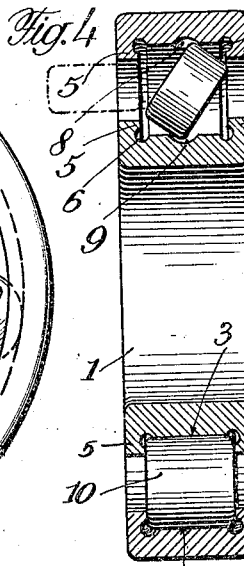
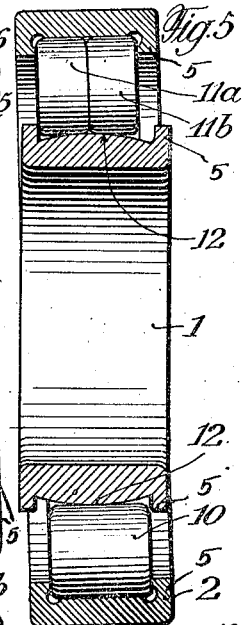
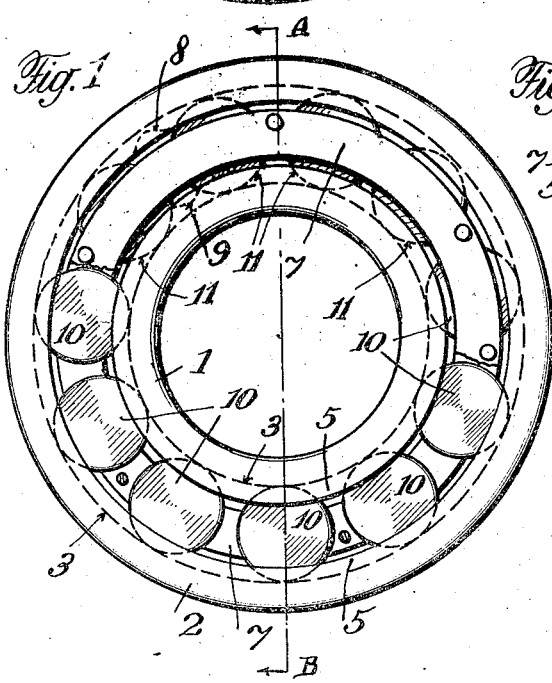
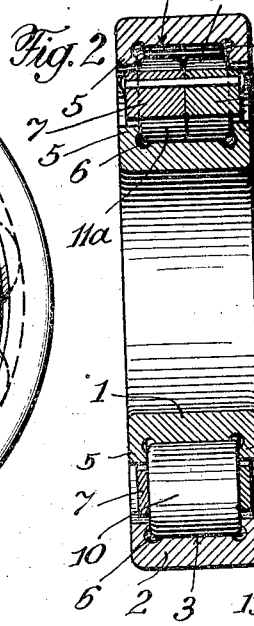
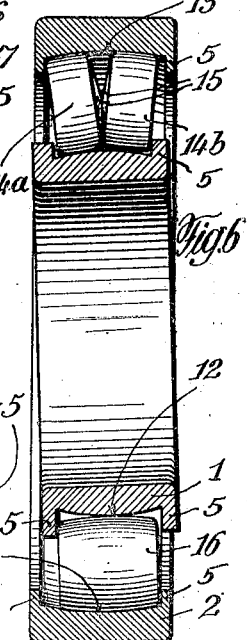
Inventor:
Hugo Drotschmann,
By 
Atty.

Patented Dec. 23, 1924.

1,520,053

UNITED STATES PATENT OFFICE.

HUGO DROTSCHMANN, OF ZURICH, SWITZERLAND.

ROLLER BEARING.

Application filed February 11, 1924. Serial No. 691,980.

*To all whom it may concern:*

Be it known that I, HUGO DROTSCHMANN, a citizen of the Republic of Switzerland, residing at Zurich, Switzerland, have invented certain new and useful Improvements in Roller Bearings, of which the following is a specification, reference being had therein to the accompanying drawing.

Roller bearings are known which comprise an inner and an outer race ring, whereby both rings are provided with races having high shoulders pointing towards each other. The present invention relates to improvements in roller bearings of this type and according to the invention two series of rollers are arranged between the race rings. One of said series comprising rollers the width of which is equal to the whole width of the race, the other of said series comprising rollers every two of which are arranged side by side and have a width equal to half of the width of the race. The first series of rollers comprises a greater number of rollers than the second series and is first inserted when the bearing is assembled. Thereupon the rollers of the second series which are fewer in number are inserted. As the roller bearing has more wide rollers than subdivided rollers it can sustain a greater load than if it were only provided with rollers consisting of narrow half rollers.

Constructional examples of the subject matter of the present invention are shown on the accompanying drawings, in which:

Fig. 1 is a side view of a first constructional example, and Fig. 2 is a longitudinal section thereof on line A—B, Fig. 1.

Fig. 3 is a side view of the bearing with the parts during assemblage and

Fig. 4 is a section of the bearing with the parts during assemblage.

Figs. 5 and 6 show two modifications of the bearing in longitudinal sections.

With the first constructional example 1 denotes the inner race ring and 2 is the outer race ring. Both race rings are provided with races 3 having high continuous shoulders 5. The parts between the shoulders 5 and races 3 are shaped as grooves 6 which prevent a jamming of the rollers. Between the race rings 1 and 2 seven rollers 10 are arranged which, as may be seen in Figs. 2 and 4, have the same width as the race 3 so that the rollers bear at both ends on the shoulders 5. The remaining four rollers 11 are each composed of two roller halves 11$^a$ and 11$^b$ so that every two roller halves are arranged side by side and are half as wide as the race. The rollers are enclosed in a cage 7 of the known type.

The assemblage of such a roller bearing is carried out so that, as may be seen in Fig. 3, the two race rings 1 and 2 are placed eccentrically to each other in the known manner, whereupon the wide rollers 10 are inserted. Thereupon the ring 1 is placed concentric to the ring 2 and then the roller halves 11$^a$ and 11$^b$ are singly introduced at first in the position indicated in dotted lines in Fig. 4 and are then turned into an oblique position as may be seen in Fig. 4, and are finally brought into the position shown in Fig. 2. In order to enable the turning of the roller halves into the oblique position the races of the inner and outer race rings are provided with small recesses 8 and 9. These recesses are placed opposite to each other, as is indicated in Figs. 3 and 4, so that the turning of a roller half is possible. In my construction it is not necessary to cut transverse passages in the shoulders 5 to permit insertion of the rollers as in many existing forms of bearings.

With the constructional example illustrated in Fig. 5 the profile of the race 12 of the inner ring has a concave curvature whereby the inner race ring may conveniently adjust itself relatively to the outer race ring, as is indicated in Fig. 5. One of the races for example of the inner ring 1 is wider than the other. The continuous shoulders 5 in such a construction prevent the rings from separating from one another and form lateral retaining abutments for the rollers.

With the constructional example illustrated in Fig. 6 the profile of the race 13 of the outer ring 2 as well as of the race 12 of the inner ring 1 are curved, the profile of the race 13 being an arc having its centre in the axis of the ring 2. The end faces 15 of the roller halves 14$^a$ and 14$^b$ pointing towards each other are spherical (Fig. 6). In consequence thereof the rollers of the second series roll laterally one upon the other whereby the rollers 14$^a$ and 14$^b$ are at an angle to each other. The rollers 16 of the other series are crowned in this constructional example.

The above described bearings possses an exceedingly high carrying power.

I claim:

1. A roller bearing having in combination, an inner race ring and outer race ring, continuous shoulders at each side of the rings between which the races are formed and two sets of rollers mounted in the races between the rings and shoulders, the rollers of one set having a length substantially equal to the width of the race and the rollers of the other set having a length such that when two such rollers are in axial alinement their combined lengths are substantially equal to the width of the race, the single rollers of the first set having end contact with said flanges and a roller of each pair of the other set having but one end face contacting with a shoulder and their adjacent end faces contacting.

2. In a roller bearing, the combination with an outer race ring and an inner race ring, each ring having continuous integral flanges at each side of the races thereof, and recesses at one point of each race about at its middle, a series of rollers of a length substantially the width of a race and a second series of pairs of rollers of a legnth substantially the width of the race, each roller of a pair capable when turned on its side to pass between the flanges and be tilted into proper position when the recess in the rings are brought opposite one another.

3. In a roller bearing, the combination with an outer race ring and an inner race ring, each ring having continuous integral flanges at each side of the races thereof, and recesses at one point of each race about at its middle, a series of rollers of a length substantially the width of a race and a second series of pairs of rollers of a length substantially the width of the race, each roller of a pair capable when turned on its side to pass between the flanges and be tilted into proper position when the recesses in the rings are brought opposite one another, and the race in one of said rings being arcuate in cross section.

4. In a roller bearing an internal and an external race ring, each having continuous integral lateral flanges at each side of their races and the races circular in cross section, the race in one ring being wider than the race in the other ring, said races having a recess at one point, a set of rollers of a length substantially the width of the narrower race, and a set of pairs of rollers each roller of a pair of substantially one-half the length of the roller of the other set.

5. In a roller bearing, an internal and an external race ring, each having continuous integral lateral flanges at each side of their races, the thickness of the flanges of one ring being greater than the thickness of the flanges of the other ring, the races being circular in cross-section and having at one point of their circumference a recess, a set of rollers each of a length of substantially the width of the race between the thicker flanges, and a series of pairs of rollers whose adjacent ends contact.

In testimony whereof I affix my signature.

HUGO DROTSCHMANN.